Feb. 5, 1952 P. H. SHERRON 2,584,626

TELEPHONE BOOTH

Filed April 8, 1949 3 Sheets-Sheet 1

INVENTOR.

PERCIVAL H. SHERRON

BY

Bussey Harding

ATTORNEYS

TELEPHONE BOOTH

Filed April 8. 1949 3 Sheets-Sheet 2

INVENTOR.

PERCIVAL H. SHERRON

BY Bussert Harding

ATTORNEYS

TELEPHONE BOOTH

Filed April 8, 1949 3 Sheets-Sheet 3

INVENTOR.
PERCIVAL H. SHERRON
BY
ATTORNEYS

Patented Feb. 5, 1952 2,584,626

UNITED STATES PATENT OFFICE 2,584,626

TELEPHONE BOOTH

Percival H. Sherron, Jamaica, N. Y.

Application April 8, 1949, Serial No. 86,149

2 Claims. (Cl. 20—3.5)

This invention relates to an improved telephone booth structure. More particularly, it relates to a telephone booth structure which is especially adapted to be fabricated largely from molded synthetic resins.

An object of this invention is to provide a telephone booth having structural elements which can be fabricated easily and rapidly and which can be readily assembled to form a strong structure.

An additional object of this invention is to provide a telephone booth having the majority of its elements adapted to being fabricated from synthetic resins.

A further object of this invention is to provide a telephone booth comprising elements which may be largely assembled by interlocking.

An additional object of this invention is to provide a telephone booth having a small number of additional parts without any sacrifice of structural strength.

A still further object of this invention is to provide a telephone booth structure which may be readily sound-proofed.

A still further object of this invention is to provide a telephone booth which may be readily manufactured in large quantities and which may be rapidly assembled by relatively unskilled labor.

These and other objects of this invention will become apparent on a reading of the description in conjunction with the drawings, in which.

With reference to both the drawings and the description, the left and right hand are applied as the telephone booth is observed from the front.

A telephone booth 2 has a left side member 3, a rear member 8 and a right side member 9. These members may be formed by conventional molding techniques from any suitable synthetic resin, such as, for example, a thermoplastic resin such as polystyrene, a vinyl resin such as polyvinyl acetate and an acrylic resin such as methyl methacrylate. Thermosetting resins may equally well be used. Thus, for example, the phenolic resins, such as, for example, phenolformaldehyde or the urea formaldehyde type resins may be used. Similarly polyester type resins and numerous of the other well known synthetic type resins may be utilized.

Figures 9, 10, 11, 12, 13, 14, 15, 16, 17, 18, 27, 28, 29, 30, 31:
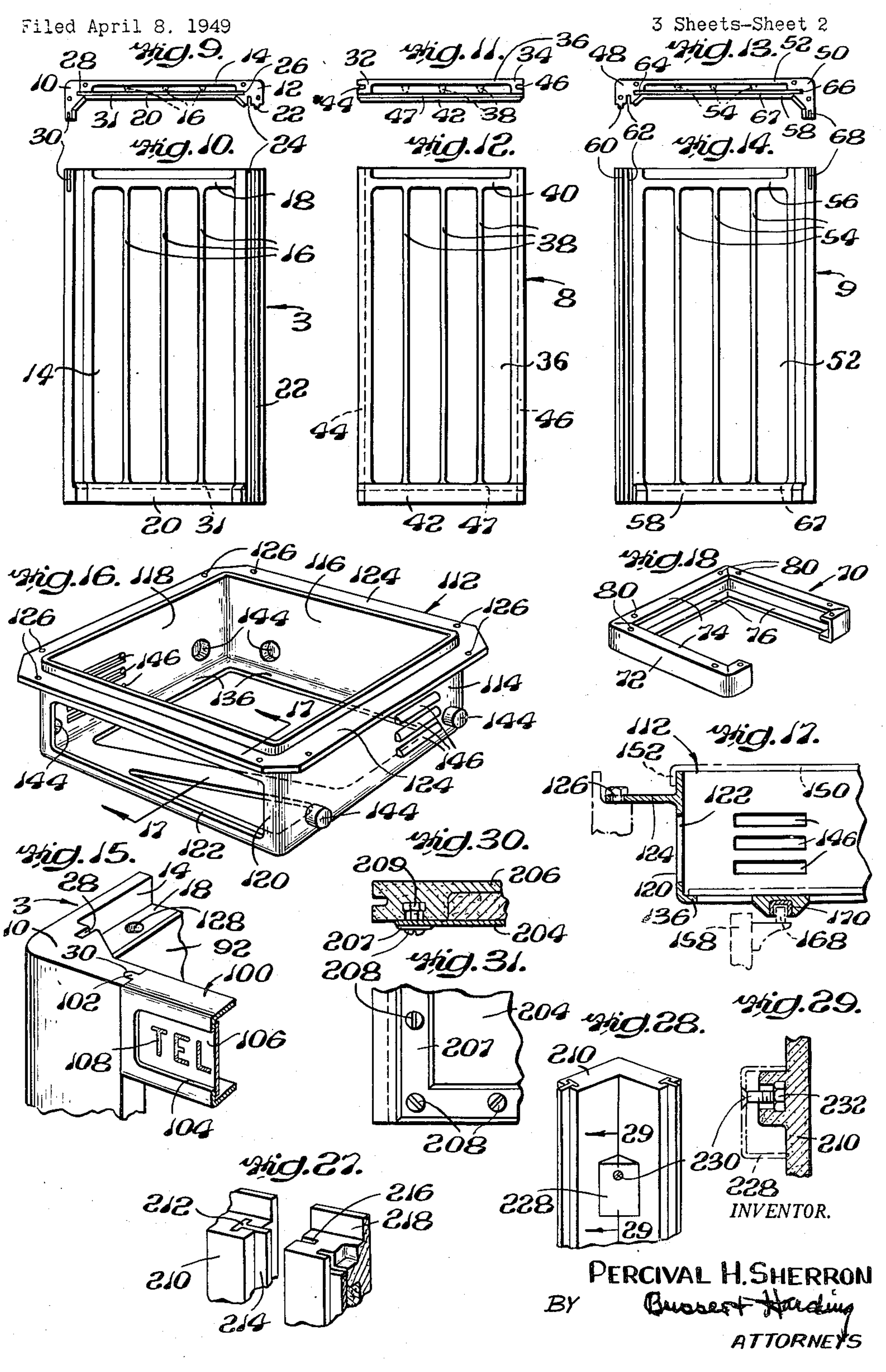
Figure 9 is a plan view of the left side panel of the telephone booth of Figure 1.
Figure 10 is an elevation of the panel of Figure 9.
Figure 11 is a plan view of the rear panel of the telephone booth structure of Figure 1.
Figure 12 is a front elevation of the rear panel.
Figure 13 is a plan view of the right side panel of the telephone booth of Figure 1.
Figure 14 is an elevation of the structure shown in Figure 13.
Figure 15 is a top perspective view of the front left hand corner of the telephone booth structure of Figure 1 before the ceiling is secured in place and showing the manner in which the lintel is secured.
Figure 16 is a top perspective view of the ceiling structure of the telephone booth of Figure 1.
Figure 17 is a vertical section taken on the plane indicated by the line 17—17 in Figure 16.
Figure 18 is a front perspective view of the base of the telephone booth of Figure 1 without flooring.
Figure 27 is a front perspective view of the panel connecting joint shown in Figure 26.
Figure 28 is a perspective view of a corner member of a modified telephone booth structure.
Figure 29 is a section taken on the plane indicated by the line 29—29 in Figure 28.
Figure 30 is a horizontal sectional view showing an alternative method of securing the interior panels.
Figure 31 is an elevation of the alternative method of securing the interior panel of Figure 30.
Figure 19:
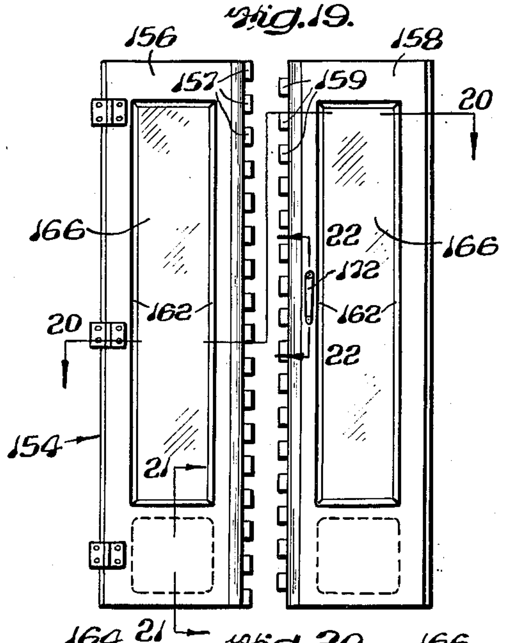
Figure 19 is an elevation of the door structure of Figure 1 as observed from the inside of the telephone booth.

As shown clearly in Figures 9 and 10, left side member 3, comprises heavy corner portions 10 and 12 which are connected by a thinner sheet 14 which is reinforced by vertical rib members 16 extending between horizontal reinforcing member 18 and base 20.

Corner portion 12 has a tongue 22, a vertical slot 24 and a vertical slot 26. Corner 10 has a vertical slot 28 and a vertical slot 30. Base 20 has a vertical slot 31 which lies in the same plane as slots 26 and 28.

As shown in Figures 11 and 12, rear member 8 has heavy vertical end members 32 and 34 connected by panel 36. Panel 36 has reinforcing ribs 38 extending between horizontal reinforcing member 40 and base 42. End members 32 and 34 have vertical slots 44 and 46, respectively. Base 42 has a vertical slot 47.

As shown in Figures 13 and 14, right side member 9 has heavy corner portions 48 and 50 which are connected by a panel 52. Panel 52 has reinforcing rib members 54 which run between horizontal reinforcing member 56 and base 58. Corner portion 48 has a tongue 60, a vertical slot 62 and a vertical slot 64. Corner portion 50 has a vertical slot 66 and a vertical slot 68. Base 58 has a vertical slot 67 which lies in the same plane as slots 64 and 66.

It will be apparent that the above mentioned members may be readily molded from synthetic resins by the use of techniques well known to the art. The design provides lightness of structure together with the requisite strength and ease of assembly.

Figure 1:
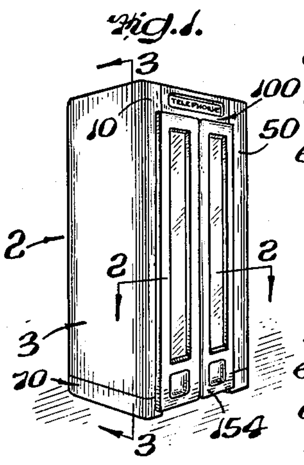
Figure 1 is a front perspective view of a telephone booth in accordance with this invention.
Figures 2, 4, 5:
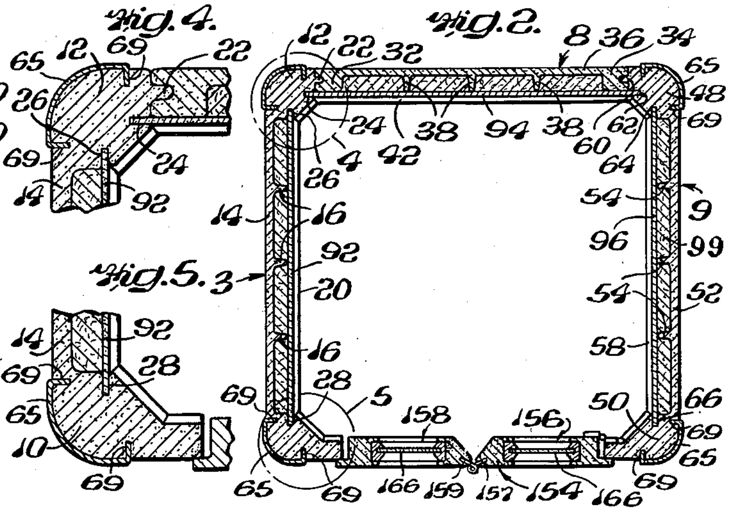
Figure 2 is a horizontal section taken on the plane indicated by the line 2—2 in Figure 1.
Figure 4 is an enlarged view of the corner of the telephone booth enclosed by the broken line circle 4 in Figure 2.
Figure 5 is an enlarged view of the corner of the telephone booth enclosed by the broken line circle 5 in Figure 2.

When desired, a decorative sheathing 65 (Figure 4) may be added to the exterior of the corner portions. The sheathing is adapted to fit into vertical slot 69 in the exterior of the corner portions.

Figures 3, 6, 7, 8:
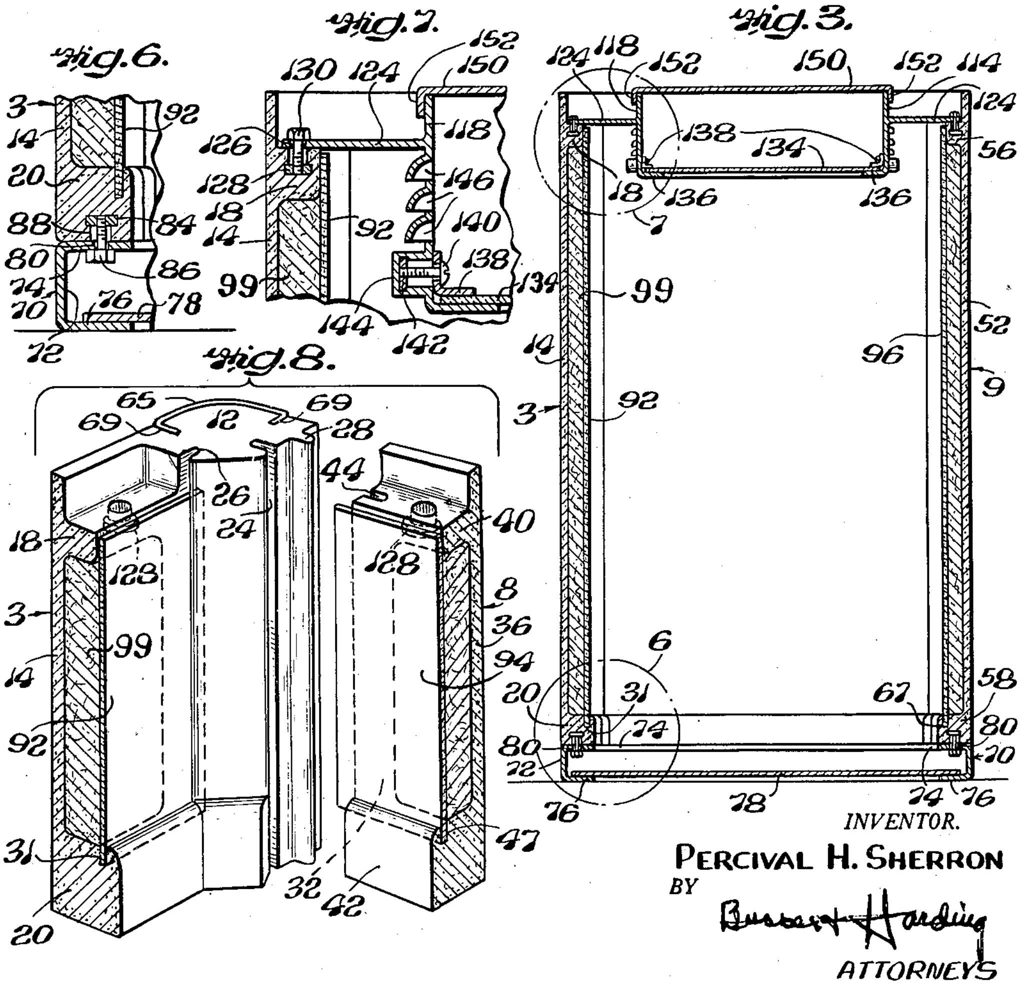
Figure 3 is a vertical section on the plane indicated by the line 3—3 in Figure 1.
Figure 6 is an enlarged view of the portion of the telephone booth structure enclosed by the broken line circle 6 in Figure 3.
Figure 7 is an enlarged view of a portion of the telephone booth enclosed by broken line circle 7 in Figure 3.
Figure 8 is a front perspective view of the left rear corner of the telephone booth structure of Figure 1 before it is assembled.

As shown in Figures 3 and 18, the telephone booth has a foundation 70 which may be formed out of sheet metal or, if desired, molded using a synthetic resin. The foundation has a vertical portion 72, an upper flange 74 and a lower flange 76. Lower flange 76 is adapted to support a floor 78. Flange 74 has a plurality of bolt holes 80. These bolt holes are arranged in pairs at each corner.

The side members 3, 8 and 9 are secured to foundation 70 by bolting (Figures 3 and 6). The side members have molded in their foundations threaded inserts 84 which are adapted to register with bolt holes 80. As shown more particularly in Figure 6, a bolt 86 is passed through bolt hole 80 in foundation 70, hole 88 in side member 3 and threaded into insert 84.

In assembling the telephone booth structure, members 3 and 9 may be bolted to foundation member 70 in the manner described above. Rear member 8 may then be secured in position by engaging tongues 22 and 60 of left side member 3 and right side member 9, respectively, with the rear member slots 44 and 46, respectively. Rear member 8 can then be moved until it rests on flange 74 of foundation 70.

The next step is to position interior panel members 92, 94 and 96. Panel 92 is adapted to slide into slots 26, 28 and 31 and faces against reinforcing member 18. Panel 94 is adapted to fit into slots 24, 62 and 47 and rests against reinforcing member 40. Panel 96 is adapted to fit into slots 64, 66 and 67 and rests against reinforcing member 56.

The space between interior panel members 92, 94 and 96 and panels 14, 36 and 52, respectively, may be filled with a suitable vibration absorbing material 99 prior to the assembly of the interior panels.

As shown in Figure 15, a lintel 100 has on either side a vertical tongue 102. Tongues 102 may be engaged with slots 30 and 68, respectively, and the lintel is then moved downwardly until its top is flush with the tops of corners 10 and 50, respectively. The lintel may have a cut-out portion 104 with a transparent sheet 106 secured behind it and carrying opaque lettering 108.

A ceiling unit 112 (Figures 3 and 16) has a right side wall 114, a rear wall 116, a left side wall 118 and a front wall 120. Front wall 120 has an opening 122 which, when assembled, registers with opening 104 in lintel 100. Ceiling unit 112 has a horizontal flange 124 which has a plurality of bolt holes 126. The bolt holes 126 are arranged in pairs at each corner and located so as to register with threaded inserts 128 which are molded in reinforcing members 18, 40 and 56 (see Figure 8). As shown more clearly in Figures 3 and 7, bolts 130 are passed through openings 126 and threaded to inserts 128 to secure the ceiling unit 112 in place.

A sheet 134 rests on flange 136 in the base of the ceiling unit. The sheet is held in position by right angle clamps 138 which are secured by bolts 140. The bolts 140 are threaded to inserts 142 which are molded into recesses 144 (see Figure 7). Walls 114 and 118 have a plurality of ventilation louvres 146 to insure adequate ventilation of the interior of the ceiling unit 112 which is adapted to contain a source of illumination to illuminate the transparent sheet 106.

As shown in Figures 3 and 7, a roof 150 has a vertical flange 152 which engages walls 114, 116, 118 and 122 of the ceiling unit.

Referring now to Figures 19 through 22, a door 154 has molded plastic panels 156 and 158 which are hinged together by a pin passing through hinges 157 and 159, respectively, which are molded in the panels. Each panel has a groove 160 which carries a rubber gasket 162. The gasket 162 has a slot 164 which holds a glass panel 166.

Panel 156 is hinged to corner 50 of right hand panel 9. As shown in Figure 17, a follower 168 which fits in channel 170 in the base of ceiling unit 112 is secured to panel 158. A handle 172 is secured to panel 158 by bolts 173 and threaded inserts 175 (Figure 22).

Figures 21, 22, 23, 26, 32:
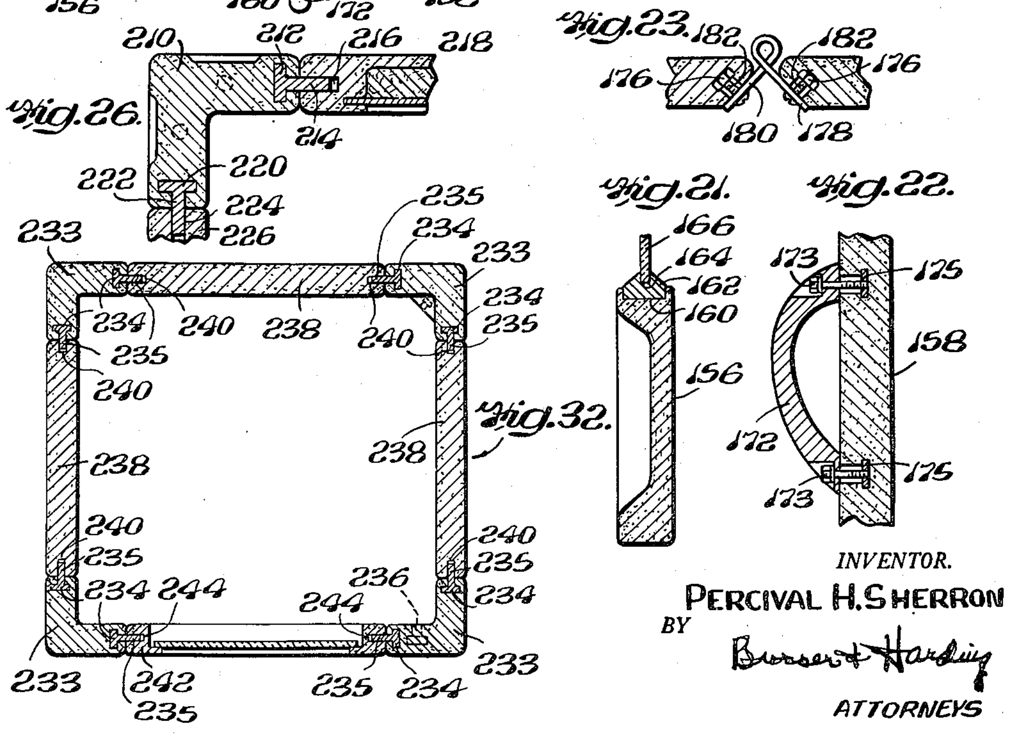
Figure 21 is a vertical section taken on the plane indicated by the line 21—21 in Figure 19.
Figure 22 is a vertical section taken on the plane indicated by the line 22—22 in Figure 19.
Figure 23 is a horizontal section through door panels like those of Figure 19 illustrating the use of a modified hinge.
Figure 26 is a horizontal section through the left hand rear corner of a modified telephone booth structure.
Figure 32 is a horizontal sectional view of a telephone booth utilizing the modified tongue and groove structure for securing the panel members to the corner members.

As shown in Figure 23 in lieu of molding the hinges joining panels 156 and 158 into the panels, it may be desirable to mold therein threaded inserts 176. The hinges 178 and 180 may then be secured to the panels by means of bolts 182.

Figure 24:
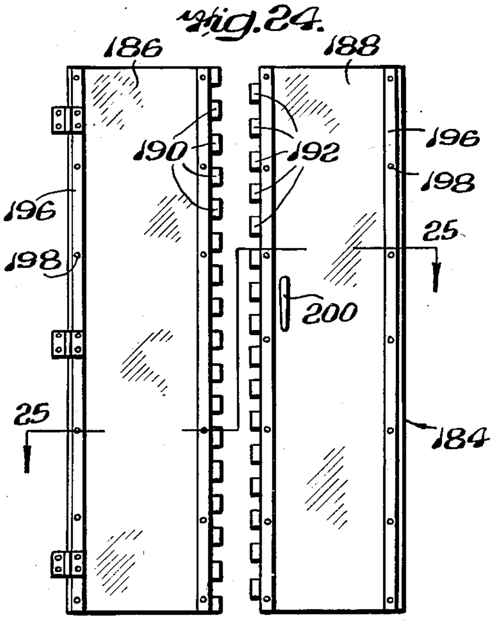
Figure 24 is an elevation of a modified door structure as observed from the inside of the telephone booth.
Figure 20:
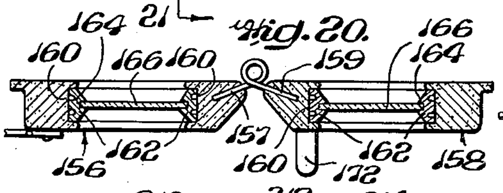
Figure 20 is a section taken on the planes indicated by the line 20—20 in Figure 19 showing the doors secured together.
Figure 25:
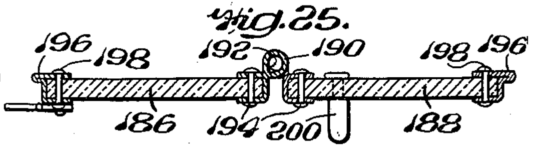
Figure 25 is a section taken on the planes indicated by the line 25—25 in Figure 24 showing the door panels secured together.

As shown in Figures 24 and 25, an alternative door 184 may be formed from a pair of plastic panels 186 and 188 which may be transparent. Thus, for example, the panels might be formed from polystyrene or any other suitable transparent plastic. Panels 186 and 188 are secured together by hinges 190 and 192 which are secured to the panels by rivets 194. Door stops 196 are secured to panels 186 and 188 by rivets 198. Similarly, a handle 200 may be riveted to panel 188. Door 184 is mounted in the telephone booth in the identical manner used to mount door 154.

As shown in Figures 30 and 31, an alternative structure may be used to secure the interior panels. Here an interior panel 204 is secured to a rear panel 206 by means of a molding 207 and bolts 208 which are threaded into an insert 209 molded into rear panel 206.

As shown in Figures 26 through 28, an alternative structure may be utilized to secure plastic panels to each other. Here a plastic corner member 210 has molded therein a T-shaped metal insert 212 which has a flange 214. Flange 214 is adapted to engage a slot 216 molded into rear panel 218. Similarly plastic corner member 210 has a metal insert 220 which has a flange 222 adapted to engage a slot 224 molded in side panel member 226. A bracket 228 for supporting telephone equipment may be secured to corner member 210 by means of a bolt 230 threaded to an insert 232 molded in the corner member (Figures 28 and 29).

Figure 32 shows a horizontal section of a telephone booth utilizing such an alternative structure to secure the panels to each other. Corner members 233 have molded therein metal inserts 234 having flanges 235. The forward right hand corner member 233 may have molded therein threaded inserts 236 to which door hinges may be bolted. The sides of the telephone booth are formed by panel members 238 which have vertical slots 240 adapted to receive flanges 235. A lintel 242 is secured to the front of the telephone booth by engaging slots 244 with flanges 235 on the front corner members 233.

What I claim and desire to protect by Letters Patent is:

1. A telephone booth structure which comprises a foundation; a pair of oppositely disposed vertical side members molded from a synthetic resin and each having heavy end portions which form the corners of the booth structure, a heavy base, a panel joining the end portions and the base, a horizontal reinforcing member between the end portions and near the top of the panel and a removable panel spaced from said first mentioned panel and secured in slots in said end portions and said base; a rear vertical member molded from a synthetic resin and having heavy end portions and a base joined by a panel, a horizontal reinforcing member joining the end portions near the top thereof, and a removable panel spaced from said first mentioned panel and secured in vertical slots in the side members and a slot in the base of the rear member; the vertical rear and side members being connected by vertically extending tongues and grooves, a plurality of said vertical members having threaded inserts molded into their bases, bolts through the foundation threaded to said inserts; and a ceiling structure having four walls, a removable top, a removable bottom and a flange extending horizontally and outwardly from the four walls, threaded inserts molded in the horizontal reinforcing members of a plurality of the vertical members, bolts through the flange of said ceiling structure and threaded to the inserts in the horizontal reinforcing members.

2. A telephone booth structure which comprises a foundation; a pair of oppositely disposed vertical side members molded from a synthetic resin and each having heavy end portions which form the corners of the booth structure, a heavy base, a panel joining the end portions and the base, a horizontal reinforcing member between the end portions and near the top of the panel and a removable panel spaced from said first mentioned panel and secured in slots in said end portions and said base; a rear vertical member molded from a synthetic resin and having heavy end portions and a base joined by a panel, a horizontal reinforcing member joining the end portions near the top thereof, and a removable panel spaced from said first mentioned panel and secured in vertical slots in the side members and a slot in the base of the rear member; the vertical rear and side members being connected by vertically extending tongues and grooves, a plurality of said vertical members having threaded inserts molded into their bases, bolts through the foundation threaded to said inserts; and a ceiling structure having an outwardly extending flange, threaded inserts molded in the horizontal reinforcing members of a plurality of the vertical members, bolts passing through the flange of said ceiling structure and threaded to the inserts in the horizontal reinforcing members.

PERCIVAL H. SHERRON.

REFERENCES CITED

The following references are of record in the file of this patent:

UNITED STATES PATENTS

| Number | Name | Date |
|---|---|---|
| 2,176,980 | Sherron | Oct. 24, 1939 |
| 2,229,775 | Sherron | Jan. 28, 1941 |
| 2,353,045 | Kuntz | July 4, 1944 |